United States Patent Office 3,333,035
Patented July 25, 1967

3,333,035
METHOD FOR PRODUCING A CEMENT PRECAST FLOOR TILE
Julian C. Williams, Freeport, Tex., assignor to The Dow Chemical Company, Midland, Mich., a corporation of Delaware
No Drawing. Filed May 31, 1966, Ser. No. 553,708
3 Claims. (Cl. 264—69)

This is a continuation-in-part of U.S. patent application Ser. No. 325,128, filed Nov. 20, 1963.

This invention relates to a method for making cement precast floor tile and, more particularly, is concerned with a method of producing cement precast floor tile having substantially no warpage.

In past years, attempts by others to manufacture precast oxychloride cement tile was discouraged by the tendency of the tile to warp. The usual practice was to pour the desired cement mixture into a mold, allowing it to harden sufficiently for removal from the mold, removing it from the mold, curing it for 2 to 24 hours at temperatures from about 70°–120° F. or even higher and finishing the surface by grinding.

In the case of making precast Portland cement tile, a longer curing time, for example, for several days to as many as 28 days, and sometimes at elevated pressures in an atmosphere of steam, is necessary before the tile can be ground. Many of the tiles warp during this curing period before grinding and are difficult to use because they do not present a smooth, even surface to contact the floor.

Heretofore, in making magnesium oxychloride precast tile, the procedure of the prior art as employed for precast Portland cement tile generally has been followed, i.e., removing the tiles from the mold after curing and thereafter grinding to produce the desired smooth, attractive surface. However, many of the finished tiles at a later date, for example, 30 days later, appear warped to a greater or lesser degree, depending upon their thickness. To illustrate, the lower surface often has a concave curvature and therefore cannot be easily bonded to the floor. The thicker the tile is, the less the curvature that will be produced when the tile warps. However, in the interest of economy and the practicality of application, it is desired to make a tile as thin as possible (e.g., about $5/32$ to $3/8$ of an inch in thickness).

An advantage in using magnesium oxychloride in the precast tile is that a thin, relatively strong tile can be made therefrom. In order to increase the strength of thin tile, additional reinforcing material such as asbestos fibers, glass fibers and the like can be added to the magnesium oxychloride before the molding step. However, this reinforcing material for thin tile has a coefficient of expansion different from the magnesium oxychloride, thus warping is more pronounced than in the un-reinforced tile, especially for the highly desirable thin tile.

Now, unexpectedly, it has been found by the present novel process that a thin, substantially warp-free, reinforced and un-reinforced precast cement tile readily can be produced by grinding the tile while still in the mold.

It is a principal object of the method of the instant invention to provide a novel process for producing a thin cement precast floor tile made from oxychloride cement or from Portland cement which tile does not warp during or after the curing or grinding steps are completed.

An additional object is to provide a method for producing a reinforced, thin oxychloride cement tile which has resilience, high strength, thinness and light weight.

Another object of the instant invention is to simplify the manufacturing process for producing a reinforced, thin cement tile by reducing the number of operations required. For example, by curing and grinding in precisely dimensioned molds, only surface grinding is necessary in order to produce a finished tile.

Other objects and advantages of the method of the instant invention will become apparent from reading the detailed description thereof disclosed herein after.

In general, the method of the instant invention comprises pouring a Portland or oxychloride cement mixture into a mold, compacting to eliminate voids and allowing it to harden into a tile form under suitable curing conditions. The hardened cement mixture, while still in the mold, is ground to give the desired smooth surface. Tiles prepared by this new and novel method, for example, curing and grinding prior to removal from the mold, show little or substantially no warpage whatsoever either as prepared or subsequent to finishing.

The curing step to be employed in similar to that known in the art, for example, heating to a temperature within the range of from about 70° to about 120° F. for a period of time within the range of from 2 hours to about 28 days.

Many cement formulations may be used in the instant invention such as magnesium oxychloride cement with or without reinforcing material and Portland cement with or without reinforcing material. The tiles may be of the terrazo type, for example, tiles made from small chips of marble set irregularly in the cement and polished. These formulations consist essentially of a filler, a binder, an aggregate and sometimes, a reinforcing material. For example, in a magnesium oxychloride cement formulation, there may be from 50 to about 80 percent by weight marble chips as aggregate; from 10 to about 20 percent by weight magnesium oxide; and from 15 to about 25 percent by weight aqueous magnesium chloride solution (of a concentration within the range of from 20 to about 25 percent by weight magnesium chloride) for use as a binder; and from 0 to about 10 percent by weight silica flour, marble flour and/or mineral pigments which are lime stable for use as fillers. In these compositions, substantially all grades of Portland cement may be used to replace the magnesium oxychloride binder. Also, magnesium sulfate solution can be used with magnesium oxide to form a magnesium oxysulfate binder. Fluorspar chips, feldspar chips and glass chips also can be used as aggregates interchangeably with marble chips.

Reinforcing materials that can be used with oxychloride cements include from about 1 to about 5 percent by weight fiberglas mat, from about 1 to about 5 percent chopped glass fibers, wire mesh, preferably galvanized, having 5 to 20 percent of the total weight, and from about 1 to about 5 percent asbestos fibers. Because of the free lime in Portland cement formulations, reinforcing materials are usually limited to metallic products such as wire mesh, rods and short lengths of wire.

Molds or forming devices ordinarily employed in the tile-making art readily can be employed in the present process. However, to facilitate the grinding of the top surface of the tile while still in the mold, preferably a mold design is used wherein the tile can be uniformly moved or raised upward in the mold to expose this top surface to the grinding medium.

One embodiment of a mold of this design for preparing square tile is described hereinafter.

An accurately dimensioned mold cavity having the commonly-used horizontal dimensions of 4″ x 4″, 6″ x 6″, 9″ x 9″, 12″ x 12″, 16″ x 16″, 24″ x 24″, 30″ x 30″ and 36″ x 36″ is provided.

The mold cavity is formed from two main parts, a frame which comprises the accurately-dimensioned openings defining the finshed horizontal dimensions of the tile, and the mold bottom plate which accurately fits into the said openings in the frame. This bottom plate floats freely but snugly within its opening and is supported separately from the frame by runners that operate on tracks separately from tracks that support the mold frame. In effect, the bottom plate is free to operate independently of the mold frame.

At the time the tile is cast in the mold cavity, the bottom plate is at its lowest position in the mold frame; for example, in making a ¼ inch thick tile, the bottom of the plate is ⅜ inch below the top of the mold cavity and it remains in this position during the tile casting and the tile curing operation. The tile blank thus has a thickness of ⅜ inch or more, of which ⅛ inch or more is to be ground off in order to expose the coarse aggregate.

When the top surface of the tile is to be ground, the bottom plate of the mold cavity is pushed upward a predetermined distance, e.g., ³⁄₁₆ inch, thus raising the top surface of the tile above the mold walls. The mold frame is held down by its track against the friction force of the raising of the tile contained within it. The grind wheel is set to grind a predetermined amount from the top surface of the raised tile in a plane above and parallel to the bottom plate of the mold. Thus, grinding is accomplished while the tile blank is essentially held tight in its mold cavity.

After the mold passes under the grinding wheel (or wheels), the bottom plate is raised to bring the bottom plate to a position flush with the top edge of the mold frame, from which position the now-finished tile may be pushed off of the mold.

The empty molds ordinarily are also further processed by cleaning, drying and application of parting compounds to prepare them for recycle through the tile casting, curing and grinding operations.

Mechanical details of the accomplishment and programming of the separate action of the mold bottom plate are not important to this invention so long as the above-described separate operations are accomplished.

Although this illustration has been presented for a mold designed to produce a square-shaped tile, it is to be understood that other shapes, e.g., rectangles, hexagons, etc., can be employed in the mold design.

The following example is merely illustrative of the invention and in no way is meant to limit it thereto.

*Example*

Magnesium oxychloride cement tiles were prepared by mixing the following materials.

(1) Aggregate:
   About 71.1 lbs. of marble chips having a white color of particle size of less than 10 mesh,
   About 52.3 lbs of marble chips having a white color of particle size from about 10 mesh to about ⅛ inch,
   About 80.8 lbs. of marble chips having a white color of particle size from about ⅛ to about ¼ inch,
   About 35.3 lbs. of marble chips having a white color of particle size from about ¼ to about ⅜ inch,
   About 26 lbs. of marble chips having a white color of particle size from about ⅜ to about ½ inch,
   About 17.4 lbs. of marble chips having a pale green color of particle size of from about ¼ to about ⅜ inch,
   About 18.1 lbs. of marble chips having a pale green color of particle size from about ⅜ to about ½ inch,
   About 18.1 lbs. of marble chips having a pale green color of particle size from about ½ to about ¾ inch.

It is understood that marble chips are a standard material of construction used as the aggregate in cement compositions, particlarly in cement compositions that are placed, cured, then machine ground to form terrazo floors and wall panels. These chips may be widely purchased in a variety of colors and are used in terrazo floors and in wall panels to produce a pleasing and decorative appearance. Marble chips are chemically inert insofar as their reaction with the cement or binder is concerned. Hence, it is common practice to use interchangeably with marble chips, chips of feldspar, chips of fluorspar, chips of glass and chips or particles of other mineral materials that have a desired color, lend themselves to smooth grinding and are inert to the cement binder.

Our process follows the above common practices established in the use of marble chips and also the usual practices of incorporating various colors of chips into the mixture in order to produce a desired color effect. It should be understood that an endless variety of possible color combinations is included in this process.

(2) Filler:
   About 17.4 lbs of silica flour which consists of pulverized silica sand, 100 percent of which will pass 100 mesh, 90 precent of which will pass 200 mesh, silk sieve,
   About 4.4 lbs of pigement mixture which consists of 99 percent titanium oxide powder and 1 percent iron oxide pigment having an orange-brown color.

It should also be understood that mineral pigments of the so-called "lime-proof" grade may be widely purchased in numerous shades of colors. Hence, the above is only one example of the virtually endless number of possible color combinations.

(3) Binder:
   About 58.4 lbs. of magnesium oxide. This is the active ingredient which reacts with 20–25 percent magnesium chloride solution in suitable proportions.

The above materials, totaling about 400 lbs., were introduced into a 55-gallon drum. The drum was closed and turned end-over-end on a rotating device for about ½ hour at 22 r.p.m. to mix the contents. Into a second vessel, a steel mixing container, was placed 3,500 milliliters of a 22.1 percent solution of magnesium chloride (weight—9.26 lbs.) and about 38.74 lbs. of a mixture from said 55-gallon drum. The total weight of aggregate, binder and filler was thus 48 lbs. The container was then mixed for about 3 minutes. A portion of the slurry thus formed was then passed through a number 20 sieve, some of the finer portion passing therethrough. This fine slurry was poured into the bottom of a mold. The amount of fine slurry poured into the mold was sufficient to saturate a 9″ x 9″ square fiberglas mat which was then placed into the mold cavity on top of the fine cement slurry. The coarse portion of the slurry retained on the sieve was returned to the second vessel mentioned above and mixed thoroughly with the unscreened slurry remaining therein. A portion of this mixture was added to the mold to fill it. After excess material was cleansed from the frame of the mold, the mold was placed in a curring oven for 8 hours at 118° F. After the foregoing curing process was complete, the mold was placed on a conveyor and passed under a grinding wheel set as hereinbefore described to produce tiles having a thickness of about ¼ inch. The resulting floor tiles were then removed from the mold. It was found that these tiles did not warp during a period of one year's observation.

In a second run employing the same mix and procedure, a separate batch of satisfactory tile was similarly prepared. This batch was cured by heating it to 100° F. for a period of about 18 hours.

In a manner similar to the foregoing example, substantially warp-free magnesium oxychloride cement precast tiles were prepared from the following operable formulation of wet slurries:

(1) From about 12 to about 16 percent by weight marble chips having an average particle size of less than 10 mesh.

(2) From about 8 to about 13 percent by weight marble chips having an average particle size of from about 10 mesh to about ⅛ inch.

(3) From about 15 to about 22 percent by weight of marble chips having an average particle size from about ⅛ to about ¼ inch.

(4) From about 10 to about 16 percent by weight of marble chips having an average particle size of from about ¼ inch to about ⅜ inch.

(5) From about 9 to about 13 percent marble chips by weight having an average particle size of from about ⅜ to about ½ inch.

(6) From about 3 to about 5.5 percent by weight of marble chips having an average particle size of from about ½ to about ¾ inch.

(7) From about 0 to about 5.5 percent by weight silica flour.

(8) From about 0.5 to about 1.5 percent by weight of pigment mixture.

(9) From about 11 to about 16 percent by weight magnesium oxide.

(10) From about 17 to about 22 percent by weight of a water solution of magnesium chloride containing 21–23 percent $MgCl_2$ by weight.

Various modifications can be made in the method of the present invention without departing from the spirit or scope thereof, for it is understood that I limit myself only as defined in the appended claims.

What is claimed is:

1. A method for preparing cement precast floor tile which comprises:
    (a) placing a member selected from the group consisting of Portland and magnesium oxychloride cement mixtures into a tile mold;
    (b) curing said mixtures in said mold so that they harden into a tile form having a thickness of from about 5/32 to about ⅜ inch;
    (c) raising the top surface of said tile a predetermined distance above the walls of said mold;
    (d) grinding the top surface of the cured tile while in said mold thereby smoothing said surface of said tile; and
    (e) removing the so-treated tile from said mold thereby producing a finished cement precast tile having excellent warpage resistant properties.

2. A method for preparing magnesium oxychloride cement precast tile which comprises:
    (a) preparing a wet slurry mixture comprised of:
        (1) from about 12 to about 16 percent by weight marble chips having an average particle size of less than 10 mesh,
        (2) from about 8 to about 13 percent by weight marble chips having an average particle size from about 10 mesh to about ⅛ inch,
        (3) from about 15 to about 22 percent by weight marble chips having an average particle size from about ⅛ to about ¼ inch,
        (4) from about 10 to about 16 percent by weight marble chips having an average particle size from about ¼ to about ⅜ inch,
        (5) from about 9 to about 13 percent by weight marble chips having an average particle size from about ⅜ to about ½ inch,
        (6) from about 3.0 to about 5.5 percent by weight marble chips having an average particle size from about ½ to about ¾ inch,
        (7) from about 0 to about 5.5 percent by weight silica flour,
        (8) from about 0.5 to about 1.5 percent by weight pigment mixture,
        (9) from about 11 to about 16 percent by weight magnesium oxide,
        (10) from about 17 to about 22 percent by weight of a water solution of magnesium chloride containing 21 to 23 percent magnesium chloride by weight,
    (b) placing said mixture into a vessel,
    (c) agitating the entire mixture for a time of from about 2 minutes to about 5 minutes,
    (d) passing a portion of this slurry through a sieve ranging from about 10 mesh to about 30 mesh so that some of the finer portions of the said slurry passes through said sieve,
    (e) pouring said fine portion of said slurry into the bottom of a mold and spreading the fine slurry evenly,
    (f) mixing the coarse material retained on the sieve with the remaining unscreened slurry,
    (g) filling the mold cavity with a portion of the mixture from step (f) and thoroughly compacting same to eliminate air void and to form a sound and accurately dimensioned tile having a thickness of from about 5/32 to about ⅜ inch,
    (h) heating the so-filled mold to a temperature within the range of from about 100° to about 118° F. for a period of from 18 to 8 hours, respectively,
    (i) raising the top surface of said tile a predetermined distance above the walls of said mold,
    (j) grinding the top surface of the so-cured mixture while in said mold; and
    (k) removing the so-treated mixture from said mold thereby producing a magnesium oxychloride cement precast tile having excellent warpage resistant properties.

3. The method in accordance with claim 2 including the step of placing a layer of glass fiber mat in the mold on top of the evenly spread fine slurry and saturating the mat with the same.

References Cited

UNITED STATES PATENTS 3,242,242   3/1966   Bornique _____ 264—71

FOREIGN PATENTS 8,905   8/1932   Australia.
629,595   9/1949   Great Britain.
938,901   10/1963   Great Britain.

ROBERT F. WHITE, *Primary Examiner.*

J. FINLAYSON, *Assistant Examiner.*